United States Patent
Burroughs et al.

(10) Patent No.: US 8,469,317 B2
(45) Date of Patent: Jun. 25, 2013

(54) LINE REPLACEABLE, FLY-BY-WIRE CONTROL COLUMNS WITH PUSH-PULL INTERCONNECT RODS

(75) Inventors: Michael A. Burroughs, Glenview, IL (US); Joel M. Hutchison, Chicago, IL (US); Darryl S. Stachniak, Chicago, IL (US)

(73) Assignee: Woodward MPC, Inc., Skokie, IL (US)

(*) Notice: Subject to any disclaimer, the term of this patent is extended or adjusted under 35 U.S.C. 154(b) by 407 days.

(21) Appl. No.: 12/910,193

(22) Filed: Oct. 22, 2010

(65) Prior Publication Data

US 2012/0097800 A1 Apr. 26, 2012

(51) Int. Cl.
*B64C 13/12* (2006.01)
(52) U.S. Cl.
USPC .............. 244/229; 244/224; 244/225
(58) Field of Classification Search
USPC .......................... 244/224, 225, 229
See application file for complete search history.

(56) References Cited

U.S. PATENT DOCUMENTS

| | | | |
|---|---|---|---|
| 3,902,379 | A | 9/1975 | Bennett et al. |
| 4,473,203 | A | 9/1984 | Barnoin et al. |
| 4,688,443 | A | 8/1987 | Fabre et al. |
| 4,716,399 | A | 12/1987 | Nordlund |
| 5,149,023 | A | 9/1992 | Sakurai et al. |
| 5,456,428 | A | 10/1995 | Hegg |
| 5,900,710 | A | 5/1999 | Gautier et al. |
| 6,572,055 | B1 | 6/2003 | Bernard |
| 2002/0135327 | A1 | 9/2002 | Szulyk et al. |
| 2008/0142642 | A1 | 6/2008 | Marino et al. |

FOREIGN PATENT DOCUMENTS

| | | |
|---|---|---|
| EP | 1 918 196 A1 | 5/2008 |
| FR | 2 558 136 A1 | 7/1985 |
| GB | 126568 | 5/1919 |
| GB | 827089 | 2/1960 |
| GB | 925471 | 5/1963 |
| GB | 2465761 A | 6/2010 |
| GB | 2482407 A | 2/2012 |
| JP | 2008204098 A | 9/2008 |

OTHER PUBLICATIONS

U.S. Appl. No. 12/844,867, filed Jul. 28, 2010, Szulyk et al.
U.S. Appl. No. 12/845,160, filed Jul. 28, 2010, Stachniak et al.
U.S. Appl. No. 12/845,246, filed Jul. 28, 2010, Stachniak et al.
U.S. Appl. No. 12/976,723, filed Dec. 22, 2010, Scott et al.

*Primary Examiner* — Tien Dinh
*Assistant Examiner* — Justin Benedik
(74) *Attorney, Agent, or Firm* — Reinhart Boerner Van Deuren P.C.

(57) ABSTRACT

A control input system is provided. The system includes a pair of control columns that are selectively interconnected such that manipulation of one of the control columns is translated to the other one of the control columns. The system includes a disconnect arrangement for each of the degrees of freedom (pitch and roll) of the system that operably disconnects the two control columns such that the two control columns can operate independently such as in the event of failure of one of the control columns. The system may also include a discontinuous force profile for a restoring force mechanism that provides tactile feedback to the pilots simulating resistance provided by control surfaces of the aircraft. The system may also include an autopilot lockout mechanism that increases the force profile experienced by the pilots when autopilot mode is entered.

19 Claims, 11 Drawing Sheets

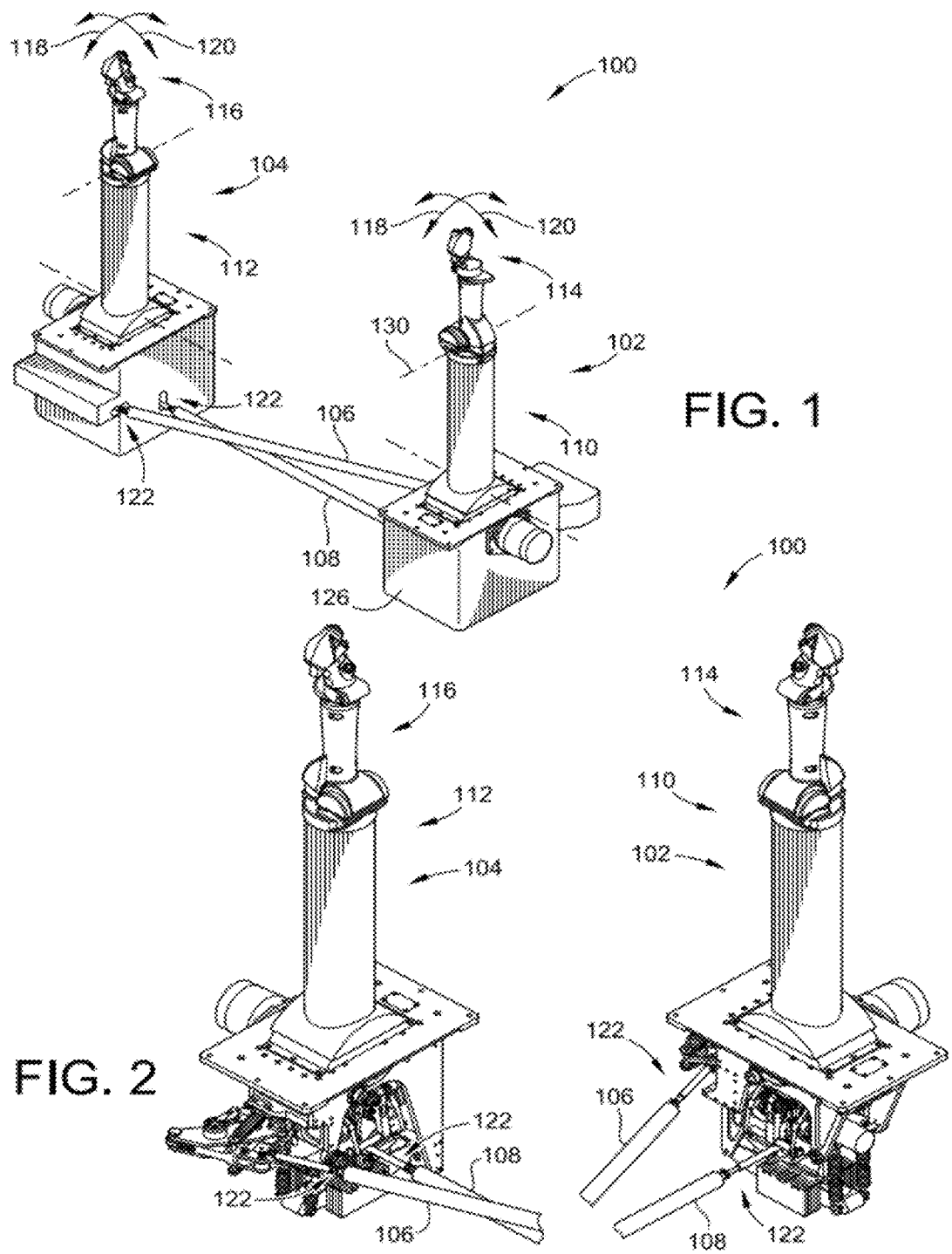

LINE REPLACEABLE, FLY-BY-WIRE CONTROL COLUMNS WITH PUSH-PULL INTERCONNECT RODS

FIELD OF THE INVENTION

This invention generally relates to fly-by-wire control columns.

BACKGROUND OF THE INVENTION

Airplanes and other aircraft typically have built in redundancy such as the ability to be flown by a pilot or co-pilot. As such, the aircraft typically includes a pair of control input devices for the pilots to input control commands to the aircraft. These control input devices are often referred to as control columns. The control columns can be used by the pilot to input control commands that include the pitch and roll of the aircraft as it is flying through the air.

Typically, each control column includes a stick that the pilot manipulates to generate a desired control signal relating to the desired amount of pitch or roll for the aircraft.

To provide tactile cues to the other pilot, the control columns are typically coupled together such that changes in position of one of the sticks results in the same or similar changes in position of the other stick of the control column. In the past, this coupling was performed by an intricate system of pulleys that passed through the floor of the cockpit.

Unfortunately, when there was a problem in one of the control columns, the entire aircraft would have to taken in for maintenance because the control column could not be removed due to the system of cables. Further, the complex pulley system provided for increased maintenance costs.

The present invention relates to improvements in the art of control columns.

BRIEF SUMMARY OF THE INVENTION

In one aspect, the invention provides a new and improved control input system for an aircraft. In one aspect, the system includes a pair of control columns that are selectively interconnected such that manipulation of one of the control columns is translated to the other one of the control columns. In another aspect of some embodiments, the system includes a disconnect arrangement for each of the degrees of freedom (pitch and roll) of the system that operably disconnects the two control columns such that the two control columns can operate independently such as in the event of failure of one of the control columns. In a further aspect of some embodiments, the system may also include a discontinuous force profile for a restoring force mechanism that provides tactile feedback to the pilots simulating resistance provided by control surfaces of the aircraft. In a further aspect of other embodiments, the system may also include an autopilot lockout mechanism that increases the force profile experienced by the pilots when autopilot mode is entered.

In another aspect, the invention provides control system including first and second control columns and roll and pitch interconnect rods. The first and second control columns receive pitch and roll control inputs from a pilot for an aircraft. Each control column has a control grip moveable along a pitch axis to adjust the pitch control input to the aircraft and moveable along a roll axes to adjust the roll control input to the aircraft. A roll interconnect rod operably couples the first and second control columns for coordinated movement of the control grips along each control grips roll axis when an input is provided to either of the control grips. A pitch interconnect rod operably coupling the first and second control columns for coordinated movement of the control grips along each control grips pitch axis when an input is provided to either of the control grips.

In a more particular aspect, a disconnect device is interposed between the grip of the first control column and the grip of the second column for a selected one of pitch or roll. The disconnect device has a coupled state fixedly coupling the grips for coordinated movement along a selected one of the pitch axis or roll axis corresponding to the selected one of pitch or roll and a decoupled state in which the disconnect device does not fixedly couple the grips such that movement of one grip along the selected one of the pitch axis or roll axis is not translated to the other grip.

In one aspect, the disconnect device includes: a pivot link that is operably coupled to the grip of one of the control columns for movement about a pivot axis; a connection link pivotably coupled to the pivot link about a release axis that is offset from the pivot axis; and a clevis link pivotable relative to the pivot link about the pivot axis, the clevis link selectively engageable with the connection link to fix the clevis link relative to the pivot link, the clevis link being operably coupled to the pitch interconnect rod.

In a further more particular aspect, a latch arrangement is provided between the pivot link and the connection link, the latch arrangement biasing the connection link into engagement with the clevis link in the coupled state. A disconnect biasing member may be provided that biases the connection link away from the clevis link to disconnect the connection link from the clevis link in the decoupled state.

In one implementation, the latch arrangement includes a pivoting catch and a preload spring. The preload spring extends between the pivoting catch and the connection link. In the coupled state, the pivoting catch is in a first position and tensions the preload spring to bias the connection link into engagement with the clevis link. In the decoupled state, the pivoting catch is in a second position and reduces the tension of the preload spring to allow the connection link to be decoupled from the clevis link.

In another feature, a disconnect biasing member is provided. The disconnect biasing member biases the connection link away from the clevis link to disconnect the connection link from the clevis link in the decoupled state when the pivoting catch is in the second position.

In another feature, the connection link includes a pair of spaced apart rollers, a distal end of the clevis link is received between the pair of rollers in the coupled state. The distal end of the clevis link includes a tapered tongue. The connection link being resiliently biased toward the clevis link.

In a more particular embodiment, a solenoid selectively engages the pivoting catch in the coupled state and prevents the pivoting catch from transitioning from the first position to the second position. The solenoid is energized such that it disengages the pivoting catch allowing the pivoting catch to transition from the first position to the second position allowing the disconnect device to transition to the decoupled state. To return the disconnect device to the coupled state, a restoring force is applied to the pivoting catch to transition the pivoting catch back to the first position. The solenoid is then de-energized such that the solenoid reengages the pivoting catch to fix the position thereof. The restoring force is typically provided by a manual external force. By requiring a manual restoring (e.g. resetting) force, a mechanic is informed that maintenance must be performed and the problem requiring the initial disconnect must be addressed. This restoring force could be provided by a cable connected to the pivoting catch. However, in alternative, embodiments, an automated return could be used to transition the pivoting catch back to the first position such as by a solenoid, which could be the same solenoid as mentioned previously.

In a further embodiment, an autopilot lockout mechanism is provided. The autopilot lockout mechanism is associated with a selected one of pitch or roll. The autopilot lockout mechanism provides increased resistance that must be overcome to manipulate the first and second control columns along the selected one of the pitch axis or roll axis when autopilot is activated.

In a particular implementation, the autopilot lockout includes: first and second autopilot plates being pivotable about an autopilot axis; an autopilot resistance spring biasing ends of the first and second autopilot plates angularly toward one another about the autopilot axis; a main link pivotable about the autopilot axis, the interconnect rod coupled to the control stick through the main link, the main link operably engaging the first autopilot plate when rotated angularly in a first direction and operably engaging the second autopilot plate when rotated angularly in a second direction, opposite the first direction; and a grounding arrangement, when autopilot is activated, selectively grounding the second autopilot plate when the main link is rotated in the first direction and selectively grounding the first autopilot plate when the main link is rotated in the second direction.

In one embodiment, the main link includes an engagement tab angularly interposed between the first and second autopilot plates. The engagement tab angularly engaging the first and second autopilot plates when the main link is rotated in the first and second directions, respectively. In one embodiment, the grounding arrangement includes a lockout arm that includes an abutment angularly interposed between the first and second autopilot plates, at least when autopilot is activated. The abutment engages the first and second autopilot plates when the first and second autopilot plates are grounded.

The lockout arm is transitional between a lockout position when autopilot is activated and a relief position when autopilot is not activated. In the lockout position, the abutment engages with the first autopilot plate when the main link rotates in the second direction and engages with the second autopilot plate when the main link rotates in the first direction. In the relief position, the abutment does not engage either the first or second autopilot plates when the main link is rotated about the autopilot axis.

In another aspect of the invention, the system includes a pitch disconnect device interposed between the grip of the first control column and the grip of the second column. The pitch disconnect device has a coupled state fixedly coupling the grips for coordinated movement along each control grips pitch axis and a decoupled state in which the pitch disconnect device decouples the grips such that movement of one grip along the grip's pitch axis is not translated to the other grip. The system further includes a roll disconnect device interposed between the grip of the first control column and the grip of the second column. The roll disconnect device has a coupled state fixedly coupling the grips for coordinated movement along each control grips roll axis and a decoupled state in which the roll disconnect device decouples the grips such that movement of one grip along the grip's roll axis is not translated to the other grip.

In a more particular implementation, the first control column includes the pitch disconnect device and the second control column includes the roll disconnect device.

And in an even more particular implementation, the first and second control columns are line-replaceable-units.

Another embodiment of the invention utilizes only a single control column and the control column is a line-replaceable unit. As such, all of the functionality of the control column forms a single self contained unit. As such, at a minimum, the feel centering (e.g. force restoring) mechanisms and the positioning sensors (e.g. for determining the pilot inputs) are formed as a single unit that is removable from the cockpit.

In a more particular embodiment, a control column comprising a control stick pivotable about a pitch axis and a roll axis; a plurality of sensors operably coupled to the control stick to sense changes in position of the control stick about the pitch axis and the roll axis; a pitch restoring force arrangement opposing motion of the control stick from a neutral position about the pitch axis; a roll restoring force arrangement opposing motion of the control stick from a neutral position about the roll axis; and wherein the control column is a line-replaceable-unit is provided.

In a more particular embodiment, the LRU control column comprises a pitch autopilot lockout mechanism and a roll autopilot lockout mechanism. The pitch autopilot lockout mechanism increases the resistance opposing motion of the control stick from the neutral position about the pitch axis when autopilot is activated. The roll autopilot lockout mechanism increases resistance opposing motion of the control stick from the neutral position about the pitch axis when autopilot is activated.

In a further embodiment, the control column is an LRU, further including an autopilot lockout mechanism associated with a selected one of pitch or roll. The autopilot lockout mechanism providing increased resistance that must be overcome to manipulate the control columns along the selected one of the pitch axis or roll axis when autopilot is activated.

In a further embodiment, the control column is an LRU, further including a disconnect device coupled to the control stick for a selected one of pitch or roll. The disconnect device has an input portion coupled to the control stick and an output portion operably couplable to an interconnect rod for transmitting input control signals from the control stick to a separate control column. The disconnect device has a coupled state fixedly coupling the input portion to the output portion. In a decoupled state, the input portion is not fixedly coupled to the output portion such that motion of the control grip is not transmitted to the output portion and motion of the output portion is not transmitted to the control grip.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a perspective illustration of a control input system according to an embodiment of the present invention;

FIG. 2 is a partial illustration of the input system of FIG. 1;

Figure 3:
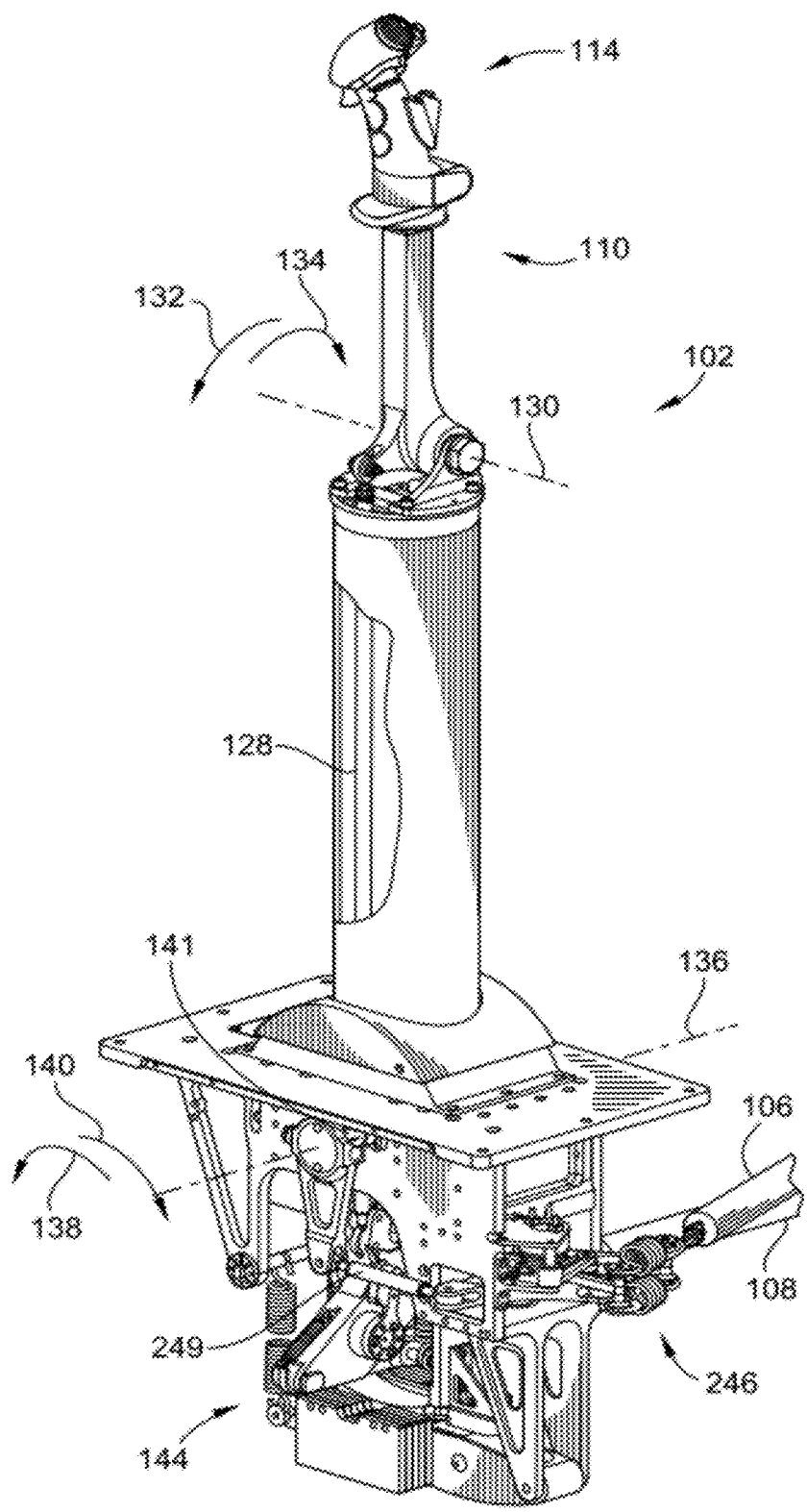
FIG. 3 is a partial illustration of a control column of the control input system of FIG. 1.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIG. 1 illustrates an aircraft control input system 100 (hereinafter "control system 100") according to an embodiment of the present invention. The control system 100 is used by the pilot and copilot to input control signals to the aircraft. For instance, the control system 100 is used by the pilot and copilot to control, among other things, the pitch and roll of the aircraft. The illustrated embodiment is considered a "fly-by-wire" unit in that the control system 100 includes a plurality of sensors that sense manipulations of the control system 100 by the pilots and converts those manipulations into electrical signals. The electrical signals are then sent to the actual devices of the aircraft that adjust the pitch or roll of the aircraft by adjusting the position of the control surfaces of the aircraft. This is unlike prior systems where the control system included a plurality of cables and pulleys that coupled the control system directly to the control surfaces of the aircraft.

In the illustrated embodiment, the control system 100 includes a pilot control column 102 and a co-pilot control column 104. Thus, each of the pilot and co-pilot have their own control column for inputting control signals to the aircraft. The pilot control column 102 and co-pilot control column 104 are interconnected such that control signals input to one of the control columns 102, 104 causes the other one of the control columns 104, 102 to also be manipulated. More particularly, if the pilot moves the pilot control column 102, the interconnection between the two control columns 102, 104 will cause the co-pilot control column 104 to move a same amount.

The interconnection between the two control columns 102, 104 is provided by a pair of push-pull rods in the form of pitch interconnect rod 106 and roll interconnect rod 108. An interconnect rod as used herein is a rigid rod that provides for both push-pull capabilities. The pitch interconnect rod 106 translates manipulations in pitch input between the two control columns 102, 104. The roll interconnect rod 108 translates manipulations in pitch input between the two control columns 102, 104. The interconnect rods 106, 108 are considered push pull rods because the interconnect rods 106, 108 can translate force by either tensile loading or compressive loading. These interconnect rods 106, 108 may be provided by tie-rods such that the linkage can be easily calibrated/adjusted.

By using the rigid interconnect rods 106, 108, only a single coupling need be provided for pitch and only a single coupling need be provided for roll. In the past, with flexible cables, two couplings would be required for each control input because the flexible cables would always need to be maintained in tensile loading. The cables would typically not be able to transmit push type inputs.

Each control column 102, 104 includes a stick 110, 112 that has a grip 114, 116 that the pilot grips and manipulates to provide control inputs to the aircraft. Typically, the pilots will move the stick forward and backward along pitch axis 118 to adjust the pitch of the aircraft and laterally side-to-side along roll axis 120 to adjust the roll of the aircraft. Due to the interconnection between the two control columns 110, 112, when either stick is manually manipulated along either axis 118, 120, the other stick will similarly move along its corresponding axis 118, 120 without the need for input by that control columns 102, 104 corresponding pilot.

One benefit of the instant invention is that the individual control columns 102, 104 are line replaceable units (LRU's). As such, the control columns 102, 104 are designed to be entirely removed when maintenance or repair is necessary for one of the control columns 102, 104. As such, during such maintenance or repair, the control column 102, 104 that is desired to be maintained or repaired is disconnected from interconnect rods 106, 108 (and any other electrical wiring harnesses) and removed from the cockpit. The maintenance operator may be required to also remove some bolts or screws that mount the unit to the cockpit, such as bolts or screws that pass through the top plate of the housing of the control columns. A replacement control column 102, 104 can then, if necessary, be immediately placed back in the cockpit such that the aircraft has very limited downtime. Further, once the control column that is undergoing maintenance or repair is removed, it can be easily maintained at a mechanics shop rather than having to be repaired in an installed state in the cockpit. Thus, it is an aspect of embodiments of the present invention that the control columns are self-contained modular units.

To facilitate easy connection and disconnection, the interconnect rods 106, 108 include couplings 122.

FIG. 3 illustrates the control column 102 with housing 126 removed to show the internal components of the control column 102. Also, a portion of stick 110 is cut away to illustrate a the push-pull roll control rod 128.

When a pilot desires to adjust the roll of the aircraft, the pilot will pivot the grip portion 114 about roll control axis 130. Motion in one direction (illustrated as arrow 132) will adjust the amount of roll of the aircraft in one direction and motion in the opposite direction (illustrated as arrow 134) will adjust the amount of roll in the opposite direction. As the system is fly-by-wire, the movement of grip portion 114 is sensed by a sensor (not shown) that indicates the desired amount and direction of roll. The sensors are typically position sensing sensors as they operate to sense the change in position of the stick.

The push-pull roll control rod 128 moves up and down within stick 110 depending on the amount and direction of desired roll. This motion is also operably transferred to the other stick 112 and grip portion 116 causing a similar amount of displacement thereof. This motion is operably transferred to the other control column 104 via roll interconnect rod 108 (see also FIGS. 1 and 2).

When a pilot desires to adjust the pitch of the aircraft, the pilot will pivot stick 110 about pitch control axis 136 by either pulling the stick (illustrated as arrow 138) or pushing the stick (illustrated as arrow 140). Again, sensors 141 within the control column 102 will sense the changes in stick position to determine the desired amount and direction of pitch. This motion is also operably transferred to the other stick 112 causing a similar amount of displacement thereof. This motion is operably transferred to the other control column 104 via pitch interconnect rod 106 (see also FIGS. 1 and 2).

The control system 100 includes disconnect arrangements to decouple the two control columns 102, 104 in the event that one of the control columns 102, 104 fails. If one of the control columns 102, 104 were to fail such that it were locked and could not be manipulated, the coupling between the control columns 102, 104 could also lock the other control column 104, 102 such that it would not work either.

Figure 4:
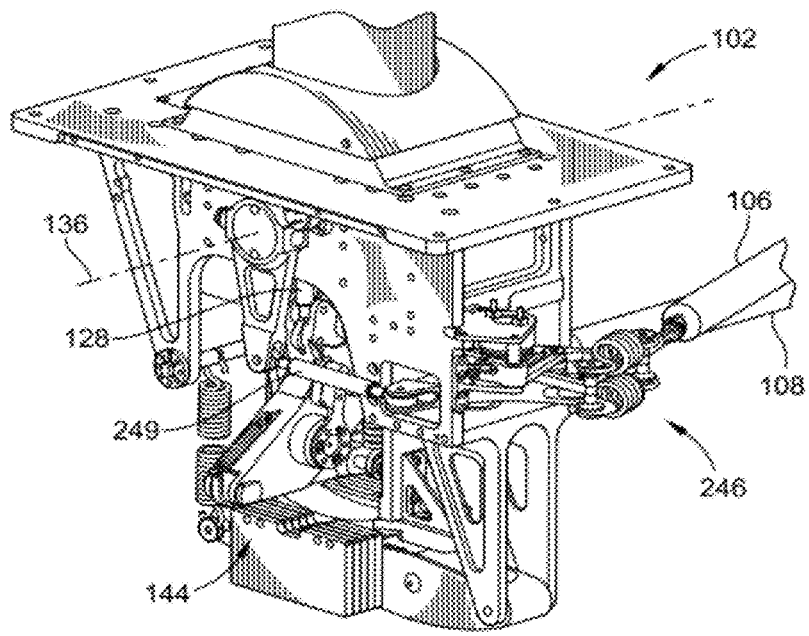
FIGS. 4 and 5 are close-up partial illustrations of the control column of FIG. 3.
Figure 5:
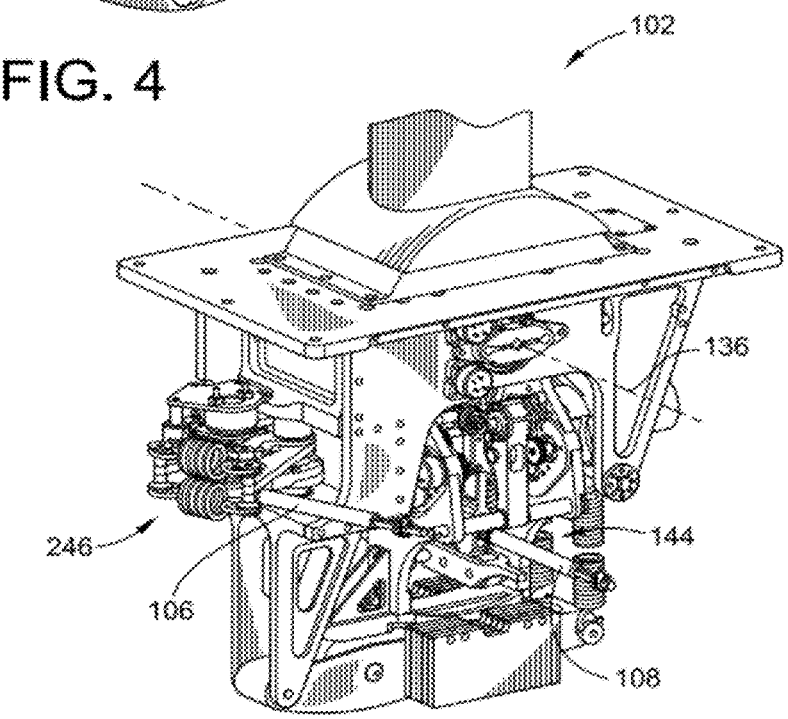

With reference to FIG. 4 control column 102 includes a disconnect arrangement in the form of roll disconnect device 144 for selectively coupling and decoupling the roll controls between the two control columns 102, 104. When the roll disconnect device 144 decouples the two control columns 102, 104, either control column 102, 104 can operate independent from the other control column 104, 102 to control the roll of the aircraft.

Figure 6:
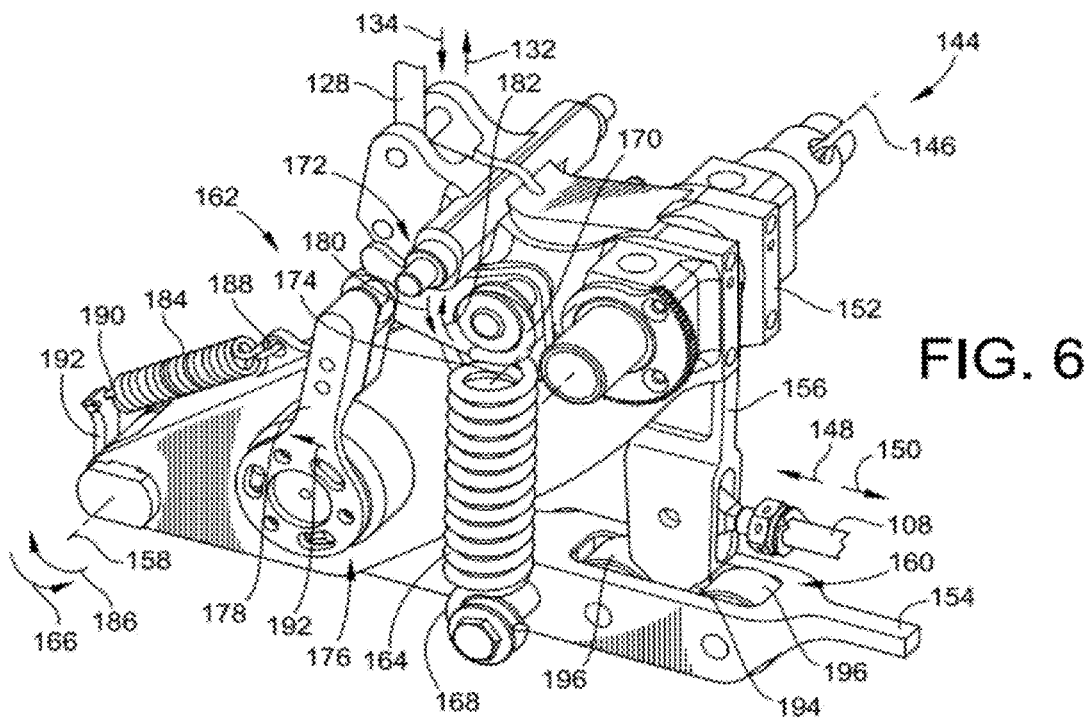
FIGS. 6 and 7 are partial illustrations of a disconnect device in coupled and decoupled states.
Figure 7:
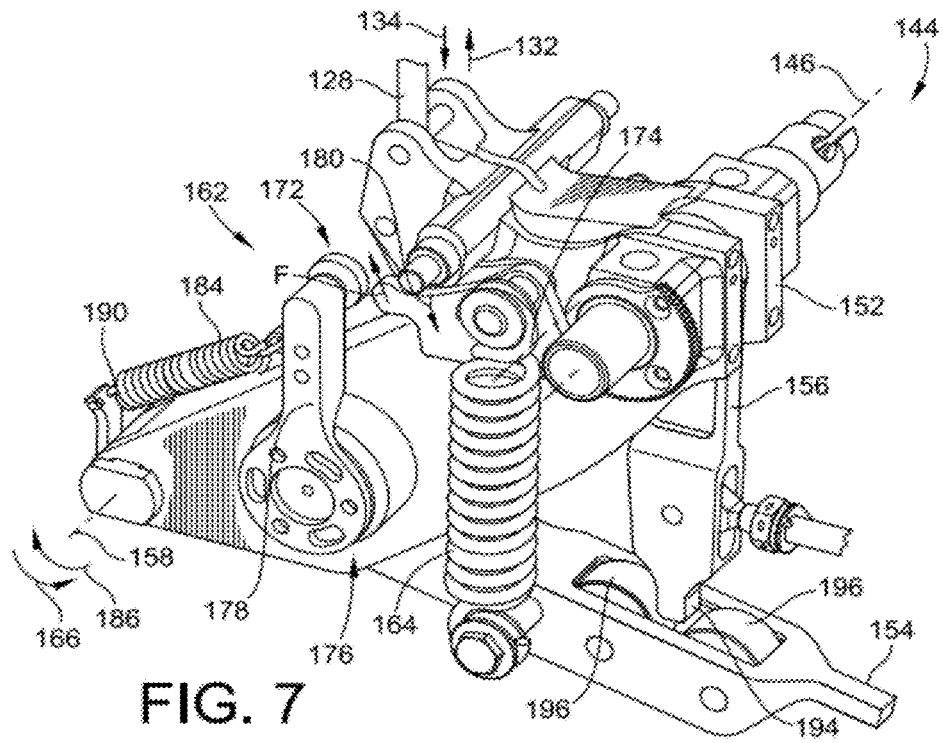

FIGS. 6 and 7 illustrate the roll disconnect device 144 in simplified form. FIG. 6 illustrates the roll disconnect device 144 in a coupled state while FIG. 7 illustrates the roll disconnect device 144 in a decoupled state.

In the coupled state, when the pilot inputs a desired amount of roll, the input (illustrated as arrows 132, 134) is transferred through push-pull roll control rod 128 to the roll disconnect device 144. Roll disconnect device 144 will pivot about pivot axis 146 causing movement of roll interconnect rod 108 (illustrated as arrows 148, 150). Similarly if the other control column 104 were experiencing a roll input signal, that force would be translated to the pus-pull roll control rod 128 through the roll disconnect device 144 to manipulate grip 114.

In the decoupled state, the input (illustrated as arrows 132, 134) is not transferred from the push-pull roll control rod 128 to the roll interconnect rod 108 via the roll disconnect device 144. Again, inputs from the pilot controlling control column 104 would also not be transferred to grip 114.

The roll disconnect device 144 includes a pivot link 152 that is pivotally mounted about pivot axis 146. The pivot link 152 has in input portion that is directly connected to push-pull roll control rod 128 such that movement of the push-pull roll control rod 128 causes pivotal motion of the pivot link 152 in both the coupled and decoupled states about pivot axis 146. This motion is transferred to roll interconnect rod 108, which is connected to an output portion of the pivot link 152.

A connection link 154 and a clevis link 156 are pivotably coupled to the pivot link and are selectively engageable with one another to transition the roll disconnect device 144 between the coupled and decoupled states.

The clevis link 156 is pivotably coupled to the pivot link 152 for pivotal movement about pivot axis 146, such that absent other restraints, the clevis link 156 and pivot link 152 can pivot relative to one another about pivot axis 146 (i.e. in the decoupled state).

The connection link 154 is pivotably coupled to the pivot link 152 for pivotal movement about release axis 158 such that absent other restraints the connection link 154 and pivot link 152 can pivot relative to one another about release axis 158.

As illustrated in FIG. 6, in the coupled state, the connection link 154 and the clevis link 156 are operably engaged with one another at interface 160. This engagement locks the clevis link 156 to the pivot link 152 such that all motion of the pivot link 152 via push-pull roll control rod 128 about pivot axis 146 is transferred through the pivot link 152 to the clevis link 156. The clevis link 156 is coupled to roll interconnect rod 108. As such, the motion is then transferred through the clevis link 256 to the roll interconnect rod 108 to manipulate the other control column 104 and, more particularly, grip 116.

A solenoid-actuated latch arrangement 162 keeps the connection link 154 engaged with the clevis link 156.

The solenoid-actuated latch arrangement 162 includes a preload spring 164 that biases connection link 154 about release axis 158 toward engagement with clevis link 156 (illustrated as arrow 166). More particularly, first end 168 of preload spring 164 is operably coupled to the connection link 154. Second end 170 is coupled to a pivoting catch 172. When in the coupled state, the positioning of the pivoting catch 172 places the preload spring in tension such that the connection link 154 is biased into engagement with clevis link 156.

The pivoting catch 172 pivots about catch axis 174 to selectively maintain or release engagement between the clevis link 156 and connection link 154.

A rotary solenoid 176 includes an arm 178 that interacts with pivoting catch 172 to prevent rotation of the pivoting catch 172. In the coupled state, as illustrated in FIG. 6, the arm 178 is engaged with pivoting catch 172 to prevent rotation about catch axis 174 in counterclockwise direction (arrow 180). This engagement acts against a torque that is applied to the pivoting catch 172 in the opposite direction (arrow 182) by preload spring 164.

A disconnect spring 184 acts to bias connection link 154 out of engagement with clevis link 156 (illustrated by arrow 186). The disconnect spring 184 has a first end 188 directly connected to pivot link 152 and an opposite end 190 directly connected to a connection flange 192 of the connection link 154. Thus, the disconnect spring 184 and the preload spring 164 act to bias the connection link 154 in opposite directions about release axis 158.

With additional reference to FIG. 7, the decoupling action will be discussed. To decouple the roll control of the two control columns 102, 104, the rotary solenoid is energized such that it rotates counterclockwise (illustrated as arrow 192) such that arm 178 disengages pivoting catch 172. This disengagement "ungrounds" the pivoting catch 172 from the pivot link 152 and frees pivoting catch 172 to rotate about catch axis 174 in a counterclockwise direction (arrow 182). With pivoting catch 172 released, the disconnect spring 184 will cause the connection link 154 to rotate in the counterclockwise direction (arrow 186) such that connection link 154 will disengage from clevis link 156 (see FIG. 7). With the connection link 154 and clevis link 156 disengaged, the clevis link 156 and, consequently, the roll interconnect rod 108 are free to move independent of pivot link 152 and push-pull roll control rod 128.

In one embodiment, the roll disconnect device 144 is manually reloaded.

To reload the roll disconnect device 144, a pilot or other operator will manually apply a force (illustrated as arrow F) to the pivoting catch 172 to cause it to rotate in the clockwise direction (illustrated as arrow 180). Typically, this manual external force F is applied by a cable connected to pivoting catch 172. When the cable is pulled or force F is otherwise generated, this external load causes the disconnect link 154 to be rotated back into engagement with clevis link 156. This manual external load also reloads the disconnect spring 184. After the pivoting catch 172 is returned to its coupled state, the rotary solenoid 176 is de-energized such that it rotates in the clockwise direction and arm 178 reengages pivoting catch 172. This engagement between arm 178 and pivoting catch 172 then again "grounds" the pivoting catch 172 relative to pivot link 152 to maintain the connection link 154 and clevis link 156 in engagement with one another.

The clevis link 156 includes a tapered tongue 194 (see FIG. 7) that is received in a cavity formed between a pair of rollers 196 to facilitate engaging the clevis link 156 and the connection link 154. In the illustrated embodiment, tapered tongue 194 is formed as a distal end of clevis link 156. Further, the connection point between the roll interconnect rod 108 and the clevis link 156 is axially between pivot axis 146 and tapered tongue 194.

The engagement between tapered tongue 194 and rollers 196 removes free play between the clevis link 156 and connection link 154. This is because the tapered portion of tapered tongue 194 is wedged into the tapered groove formed between the pair of rollers 196.

Further, with this configuration, reengagement between the clevis link 156 and the connection link 154 is prevented unless both control columns 102, 104 are in the same roll position. Typically, the arrangement is configured such that both control columns 102, 104 must be in a roll neutral position before the clevis link 156 and connection link 154 will reengage. More particularly, before tapered tongue 194 can be inserted between rollers 196.

Because only a single disconnect is needed between the pilot and co-pilot columns 102, 104, only one of the pilot or co-pilot columns 102, 104 will include the roll disconnect device 144. However, to save space, which ever control column 102, 104 includes the roll disconnect device 144, the other one of the control columns 102, 104 will typically include a pitch disconnect device.

Figure 8:
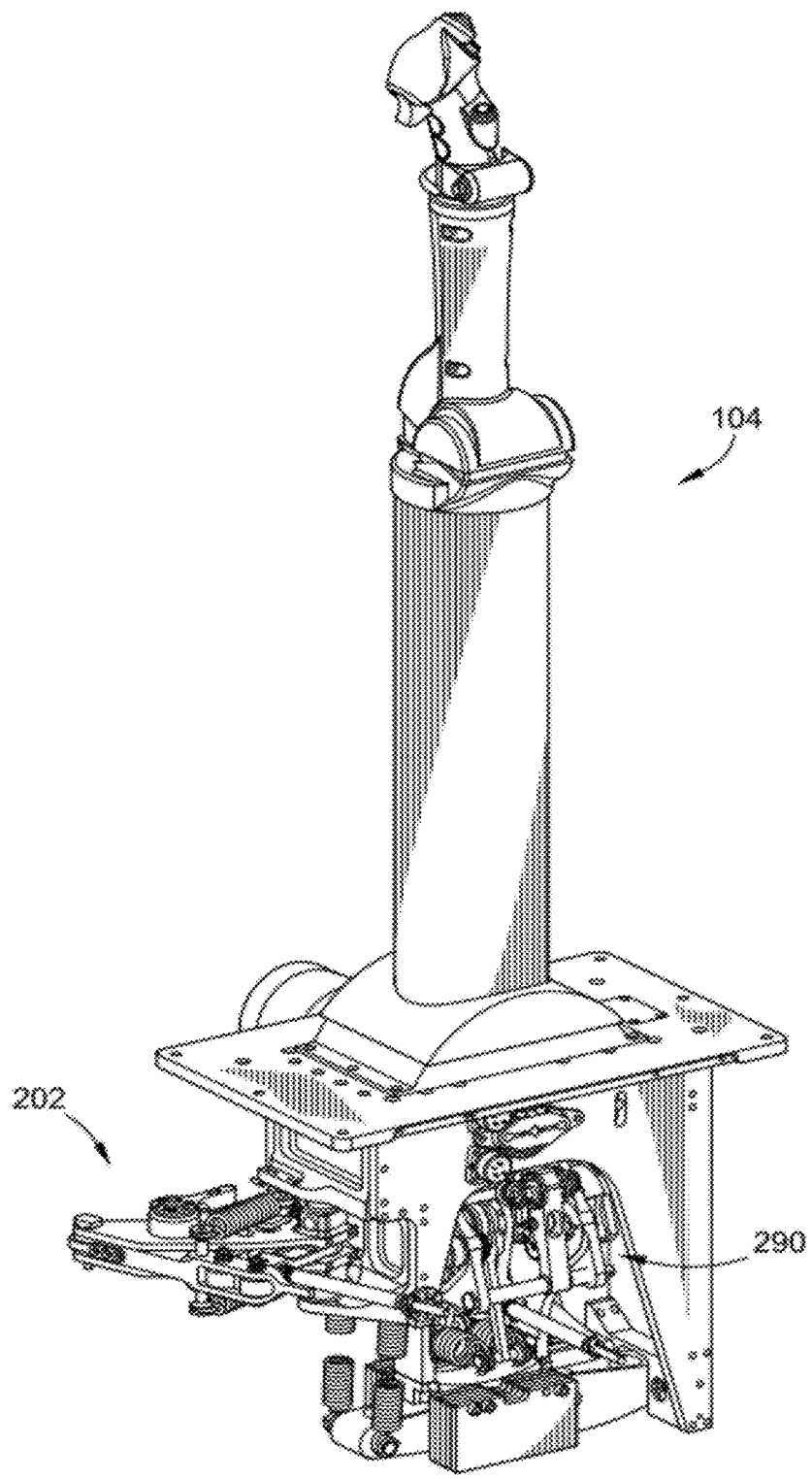
FIGS. 8 and 9 are partial illustrations of the other control column of the control input system of FIG. 1.
Figure 9:
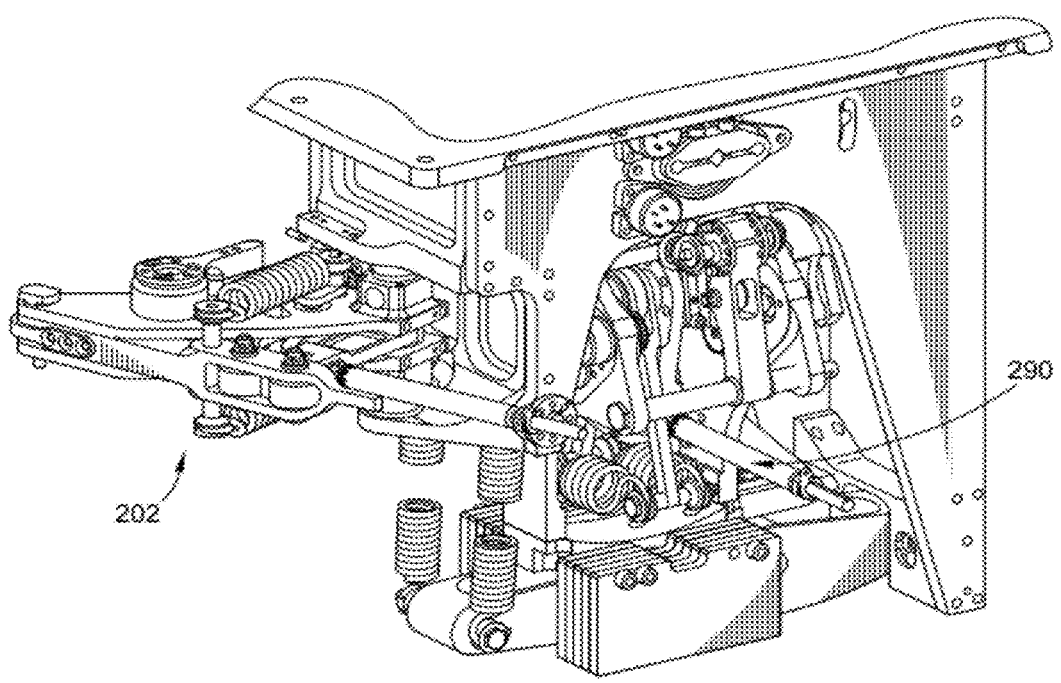

With reference to FIGS. 8 and 9 the control column 104 is illustrated with a portion of the outer housing removed. In these illustrations, the pitch disconnect device 202 is shown. The pitch disconnect device 202 operates substantially identical to the roll disconnect device 144 discussed above except it is stored in the control column 104, for the reasons outlined above.

Because the control system 100 is a fly-by-wire system, the control columns 102, 104 thereof are not mechanically coupled to the control surfaces of the aircraft. As such, the control columns 102, 104 will include mechanisms for providing restoring forces to the control columns 102, 104 that generally oppose motion of the grips 114, 116 from neutral positions. These restoring forces are also typically centering forces that drive the control sticks 110, 112 back to a neutral or centered position. Typically, the more a pilot desires to manipulate a grip from the neutral or centered position. The more restoring force that must be overcome to transition away from the neutral position. Typically, one restoring force mechanism is provided for each degree of freedom, i.e. one for pitch and one for roll.

It is an aspect of embodiments of the invention that the control columns 102, 104 are exposed to discontinuous restoring force profiles for controlling and adjusting pitch of the aircraft. Notably, in a preferred embodiment, the roll degree of freedom has a continuous restoring force profile.

Figure 10:
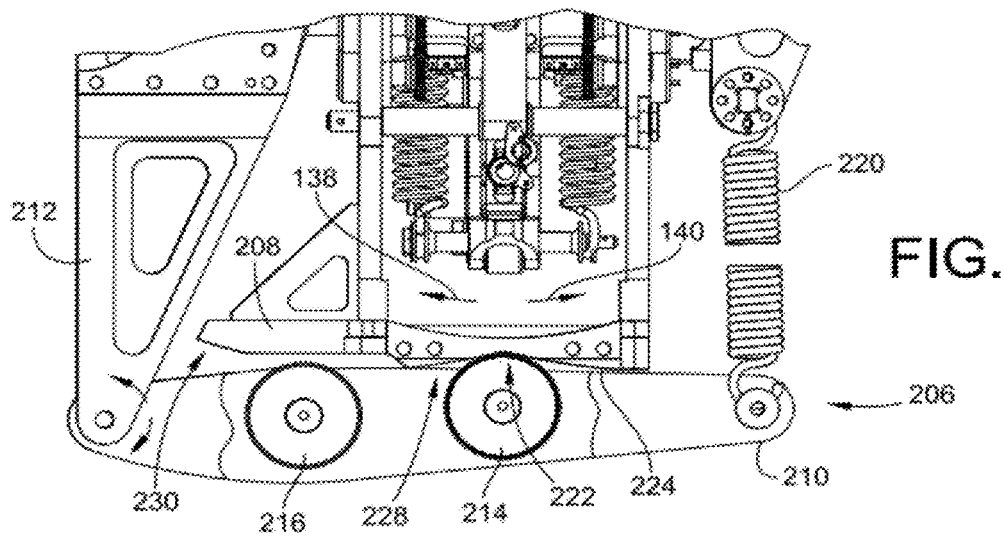
FIGS. 10 and 11 are partial illustrations of restoring force arrangement that provides a discontinuous force profile.
Figure 11:
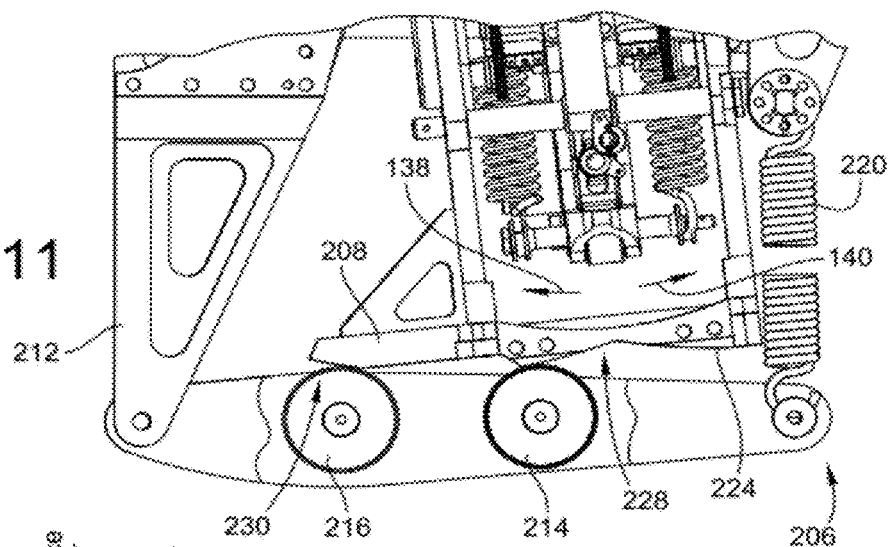

With reference to FIGS. 10 and 11, a restoring force arrangement 206 is illustrated that provides the resistance simulating the control surfaces of the aircraft when a pilot attempts to adjust the pitch of the aircraft.

FIG. 10 illustrates the restoring force arrangement 206 in a pitch neutral position. In this position, the pilot is not requesting any change in pitch.

The restoring force arrangement 206 includes a force profile cam 208 that interacts with a spring loaded rocker arm 210. The force profile cam 208 is operably coupled to the control stick 110 such that when the pilot requests changes in pitch, i.e. moves the grip control stick 110 forward and backward (arrows 138, 140) about pitch control axis 136, the force profile cam 208 rotates about the pitch control axis 136 relative to ground 212.

The rocker arm 210 carries a pair of cam follower rollers 214, 216. A pair of cam follower springs 218, 220 bias cam follower rollers 214, 216 toward the force profile cam 208.

More particularly, cam follower springs 220 bias rocker arm 210 towards force profile cam 208 which carries cam follower rollers 214, 216. The rocker arm 210 is hingedly attached to ground 212 at one end and engaged by cam follower springs 220 to bias the cam follower rollers 214, 216 into force profile cam 208.

In the neutral position (FIG. 10), the first cam follower roller 214 is received in a V-shaped groove 222 formed in the cam surface 224. In the neutral position, the first cam follower roller 214 engages both sides of the groove 222. Further, the groove 222 and spring force provided by cam follower springs 220 is configured such that a predetermined amount of force must be applied to the control column 102 prior to the control column moving at all to adjust the pitch of the aircraft. This initial force is illustrated in the schematic representation of the force profile in FIG. 12 at points 236, 237.

The use of the V-shaped groove 222 also provides centering force that will tend to bias the control stick 110 back to the neutral or centered positions. This arrangement can also be referred to as a feel centering mechanism.

Once the a sufficient amount of force is applied to the control column 102 to overcome the initial required force, the first cam follower roller 214 will move along a first portion 228 of the cam surface 224. After a predetermined amount of displacement, the second cam follower roller 216 will simultaneously engage a second portion 230 of cam surface 224. This second portion 230 provides a new level of force that must be overcome by the pilot to increase the amount of pitch requested by the pilot. This discontinuous jump in force required to displace the control column provides tactile feedback to the pilot that the pilot is requesting a large degree of pitch in an attempt to prevent a stall in the aircraft if the pilot attempts to climb at too great of a rate.

The illustrated force profile cam 208 has the discontinuous force profile only for pitch-up pitch control inputs. As such, when the pilot requests pitch-down pitch control, the pilot will not experience a discontinuous change in resistance.

Figure 12:
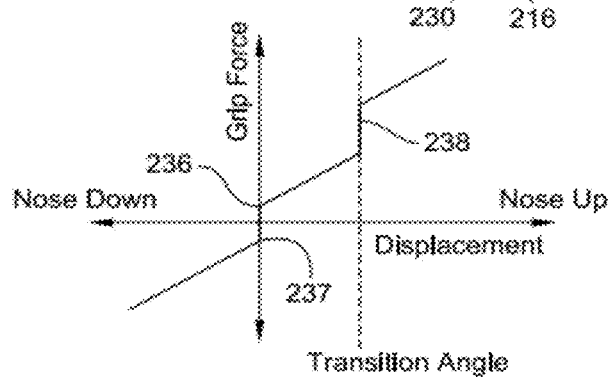
FIG. 12 is a simplified graph illustrating a force profile provided for the restoring force arrangement of FIGS. 10 and 11.

With reference to FIG. 12, the force profile for the restoring force arrangement 206 is illustrated. The vertical axis is the restoring force that is applied to the stick by the restoring force arrangement. The horizontal axis is the amount of stick displacement from a neutral position. The force profile illustrates that a minimum amount of force 236, 237 is required to initially displace the stick 110 from a neutral position. When the pilot is requesting the pitch to change by having the nose of aircraft go down, the force profile will remain continuous no matter the amount of displacement of the stick 112 from neutral. However, the force profile illustrates that as the pilot inputs more and more change in pitch having the nose of the aircraft moving up, at some point 238 the resistance force at the grip will jump discontinuously. This point 238 is when both the first and second cam follower rollers 214, 216 contact their respective portions 228, 230 of cam surface 224. Once the arrangement transitions from engagement between the first cam follower roller 214 with first portion 228 to engagement between the second cam follower roller 216 with second portion 230, the force profile once again increases continuously.

As noted above, illustrated restoring force arrangement 206 provides the resistance to the control grip 114 for the pitch degree of freedom. However a similar unit is also provided for the roll degree of freedom. However, this unit has only a single surface portion (unlike the separate portions 228, 230 of the pitch restoring force arrangement 206) because it provides a continuous force profile for roll in either direction. The restoring force arrangement for roll would also provide feel centering.

FIGS. 13-16 illustrate a further aspect of embodiments. This aspect relates to an autopilot lockout mechanism that increases the amount of resistance a pilot feels at the grip when the pilot attempts to adjust either pitch or roll manually when the aircraft is set to autopilot. Like the pitch and roll disconnect devices discussed previously, the autopilot lockout mechanisms are substantially the same for both pitch and roll. Thus, only a single autopilot lockout mechanism will be described, namely the autopilot lockout mechanism 246 for pitch. Further only a single autopilot lockout mechanism 246 need be provided for each degree of input (i.e. pitch or roll).

Figure 13:
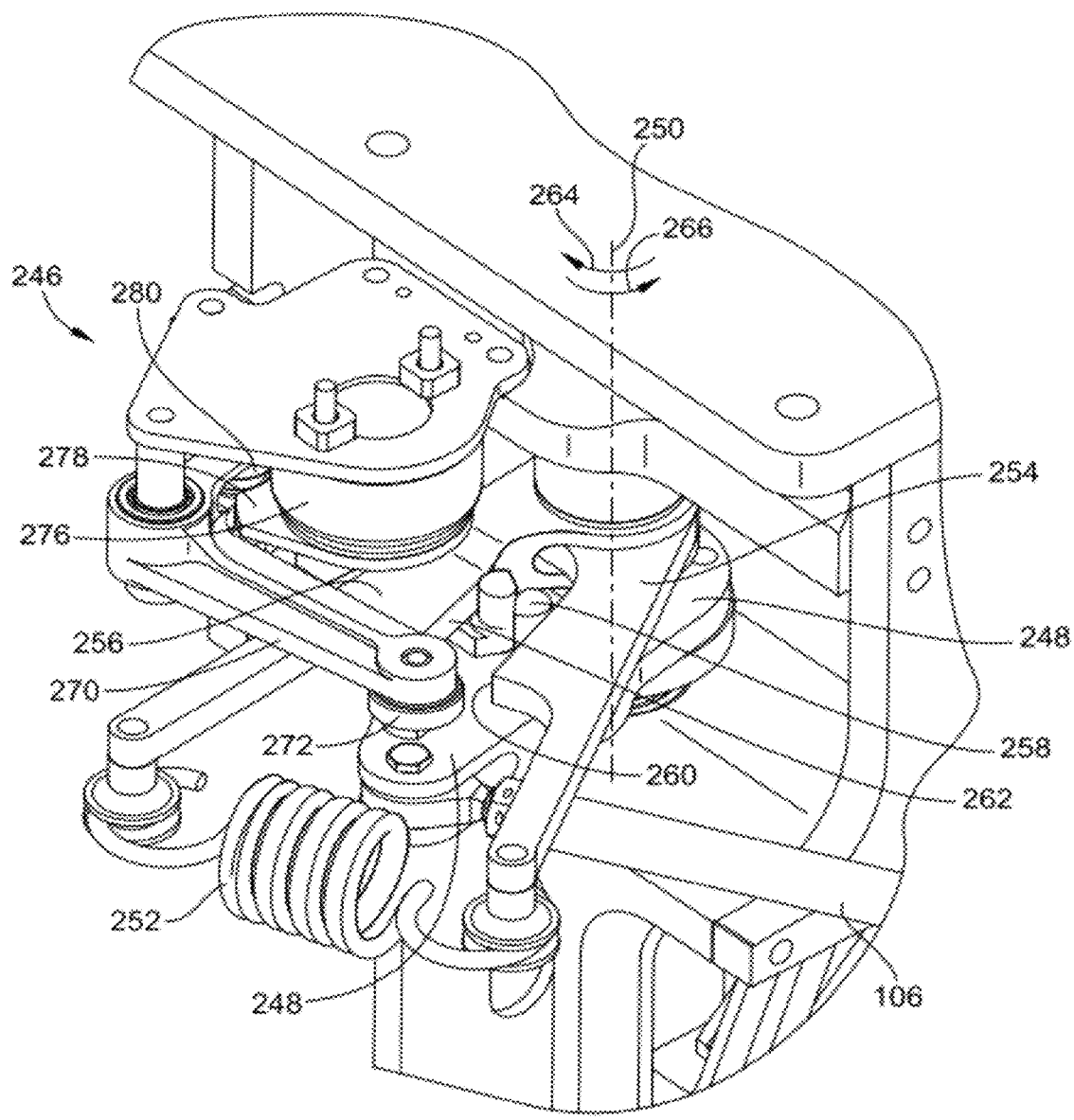
FIGS. 13-17 are simplified partial illustrations of an autopilot lockout mechanism.
Figure 14:
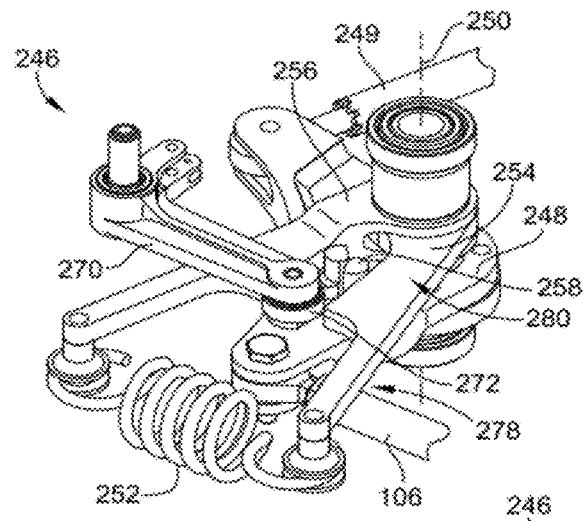
Figure 15:
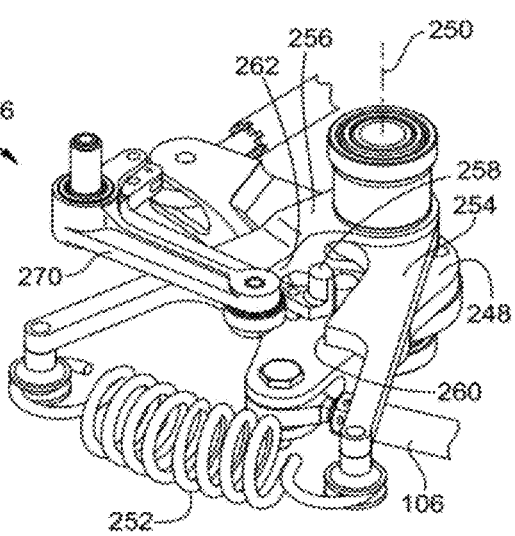
Figure 16:
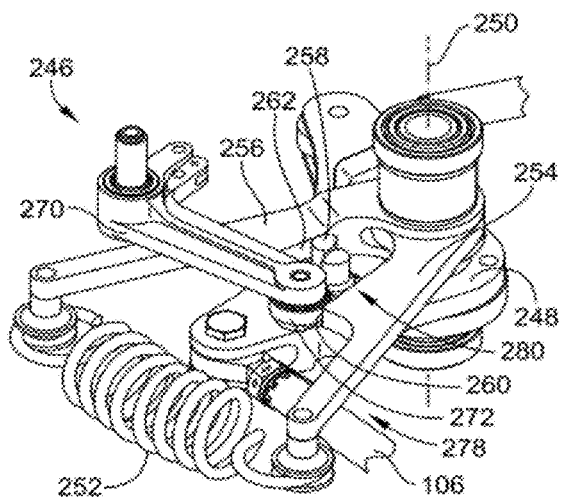
Figure 17:
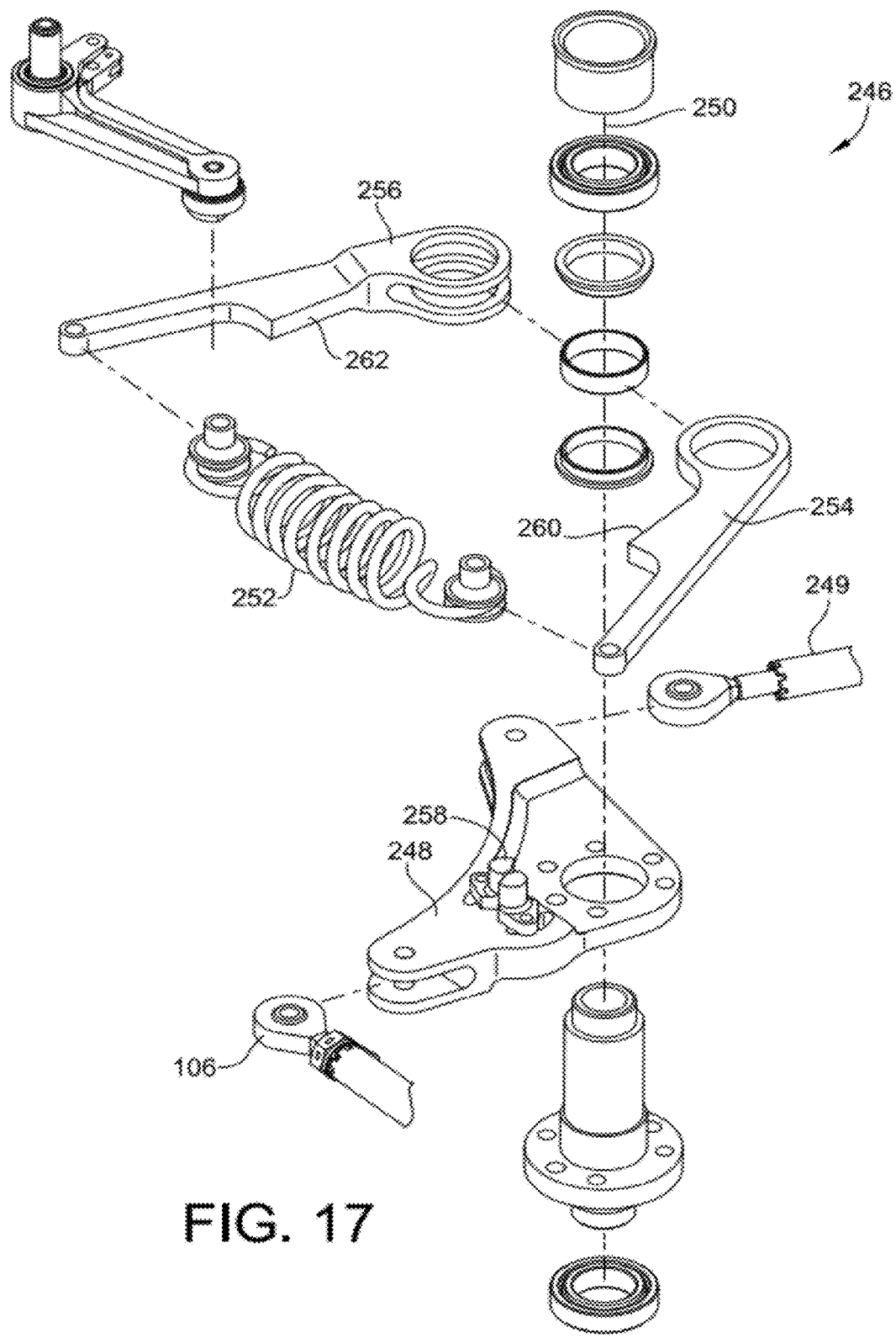
Figure 18:
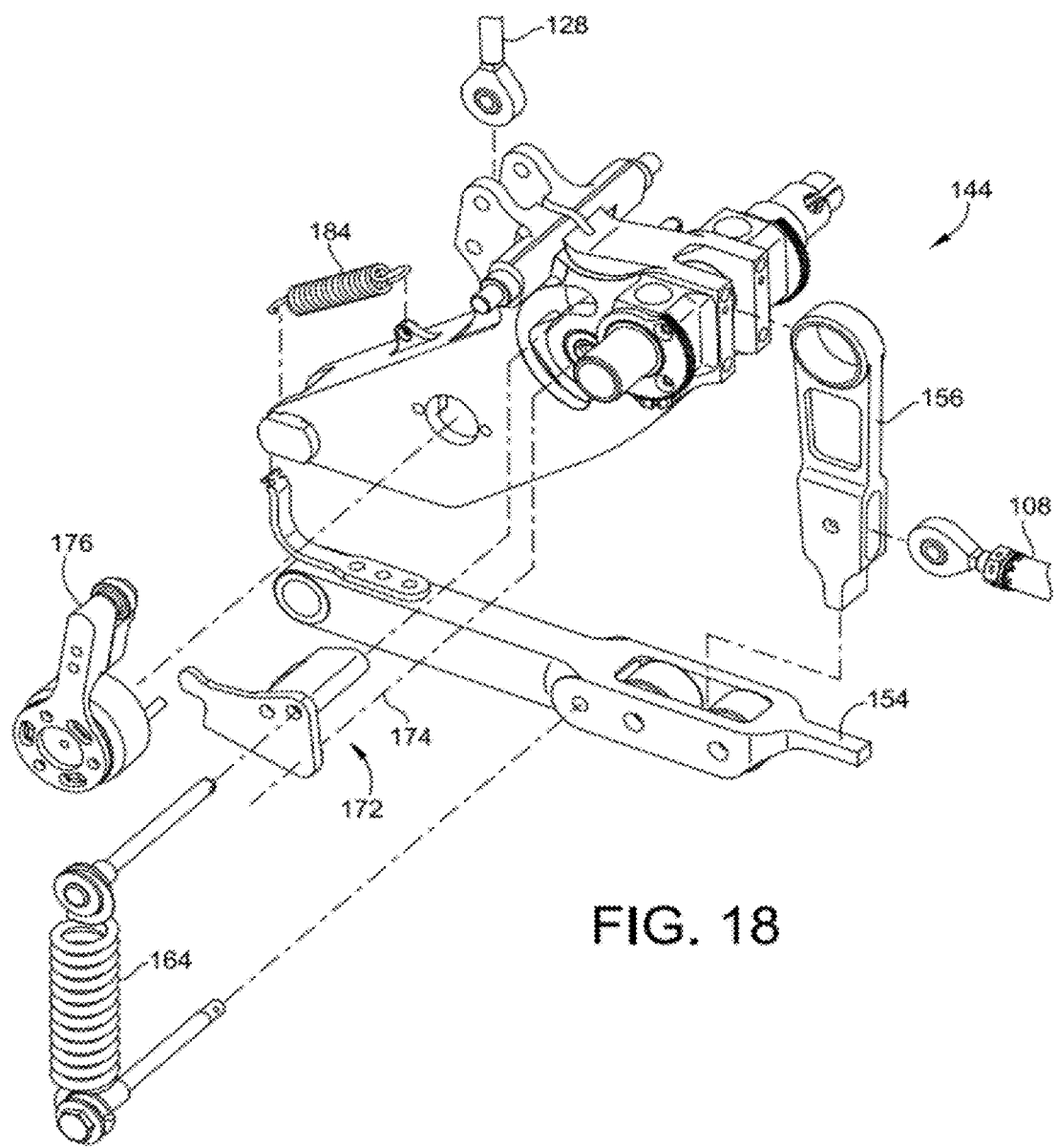
FIG. 18 is an exploded view of the disconnect device of FIGS. 6 and 7.

FIG. 13 illustrates the autopilot lockout mechanism 246 in a state when autopilot is not activated. FIG. 14 illustrates the autopilot lockout mechanism 246 in a state when autopilot is activated. FIGS. 15 and 16 illustrate the operation of the autopilot lockout mechanism 246 when the pilot is requesting changes in pitch while autopilot is activated.

Autopilot lockout mechanism 246 includes a main link 248 that operably couples an input push-pull linkage 249 from the control stick 110 to the pitch interconnect rod 106. The main link 248 pivots about pitch autopilot axis 250 such that pitch control inputs applied thereto are transferred to the pitch interconnect rod 106 to be transferred to the other control column 104.

During normal operation, the autopilot lockout mechanism 246 has no effect on the rotational motion of main link 248 (see FIG. 13). However, when the autopilot is activated, the autopilot lockout mechanism will inhibit motion of the control columns 102, 104 when the pilot attempts to manually adjust the pitch of the aircraft (see FIGS. 14-16). In the illustrated embodiment, the pitch autopilot lockout mechanism 246 will operably couple the main link 248 to one or more autopilot resistance spring(s) 252 that will oppose motion of both control columns 102, 104 when changes in pitch are requested and autopilot is activated.

The autopilot lockout mechanism 246 includes a pair of autopilot plates 254, 256. The autopilot plates 254 pivot about autopilot axis 250 at one end and are resiliently coupled to one another by autopilot resistance springs 252 at the opposite end. The autopilot resistance springs 252 angularly bias the autopilot plates 254, 256 toward one another about autopilot axis 250.

The main link 248 includes an engagement tab 258 (or a plurality of engagement tabs) that is angularly interposed between the autopilot plates 254, 256. During manual operation (autopilot is not activated and illustrated in FIG. 13), angular inner surfaces 260, 262 of autopilot plates 254, 256 will be biased into angular engagement with engagement tab 258 by the angular preloading provided by autopilot resistance springs 252. As such, when main link 248 is driven angularly about pitch autopilot axis 250, the motion is transferred from the main link 248 to the pair of autopilot plates 254, 256. More particularly, when main link 248 is rotated clockwise (illustrated as arrow 264), engagement tab 258 will engage angular inner surface 262 causing the autopilot plates 254, 256 to also rotate in the clockwise direction along with main link 248. When main link 248 is rotated in the opposite counterclockwise direction (illustrated as arrow 266), engagement tab 258 will engage angular inner surface 260 causing the autopilot plates 254, 256 to also rotate in the counterclockwise direction along with main link 248 about autopilot axis 250.

The autopilot lockout mechanism 246 includes a grounding arm 270 that selectively grounds the autopilot plates 254, 256 such that only one of the autopilot plates 254, 256 will rotate with the main link 248 about autopilot axis 250 at a time while the grounded autopilot plate 254, 256 remains stationary. With one of the autopilot plates 254, 256 grounded and while the other autopilot plate 256, 254 rotates with main link 248 due engagement with engagement tab 258, the two autopilot plates 254, 256 will be biased angularly apart from one another which will stretch autopilot resistance springs 252. This stretching will provide additional loading that the pilots must overcome to change the stick position. This increased loading indicates that autopilot is activated.

Grounding arm 270 includes a lockout roller 272 that is positioned angularly between the autopilot plates 254, 256. The lockout roller 272 is the portion of grounding arm 270 that forms an abutment that actually engages inner angular surfaces 260, 262.

The radial position of lockout roller 272 relative to autopilot axis 250 determines if lockout mode is in a lockout state or a free state. A solenoid 274 drives grounding arm between a lockout state (i.e. when autopilot is activated as in FIGS. 14-16) and a free state (i.e. when autopilot is not activated as illustrated in FIG. 13). The lockout state positions the roller 272 radially inward from the free state.

The gap formed angularly between the inner angular surfaces 260, 262 includes a relief zone 278 and a lockout zone 280 (see FIG. 14). The relief zone 278 is radially outward from the lockout zone 180. The lockout roller 272 is positioned within the lockout zone 280 when autopilot is activated and within the relief zone 278 when autopilot is deactivated.

The lockout roller 272 and autopilot plates 254, 256 are configured such that the relief zone 278 is sized and configured such that when the lockout roller 272 is in the relief zone 278, the autopilot plates 254, 256 will not engage the lockout roller 272 or at least they will not engage until or approximately at the maximum amount of pitch.

The lockout roller 272 and autopilot plates 254, 256 are configured such that lockout zone 280 is sized and configured such that when the lockout roller 272 is in the lockout zone 280, the autopilot plates 254, 256 will engage (depending on the direction of travel) the lockout roller 272 to ground the respective autopilot plates 254, 256 as discussed previously.

The abutment portion of the grounding arm 270 need not include a roller 272 but could in the alternative merely have a projection.

With reference to FIG. 13, a solenoid 276 is used to transition the autopilot lockout mechanism 246 between the two states. The solenoid 276 is coupled to or otherwise includes cam 278 that interacts with cam roller 280 at an opposite end of grounding arm 270. The solenoid 276 operably drives the grounding arm 270 radially inward and outward such that the lockout roller 272 is selectively transitioned between the relief zone 278 (i.e. when autopilot is not active) and lockout zone 280 (i.e. when autopilot is active).

A similar autopilot lockout mechanism would also be provided between the two control columns 102, 104 for providing autopilot lockout of the roll degree of freedom of the control columns 102, 104.

With primary reference to FIGS. 1 and 2, the control columns 102, 104 are substantially self-contained modules such that they are line-replaceable-units. In other words, the entire control column 102, 104 including the stick, its associated sensors, any autopilot lockout mechanisms and any disconnect devices are formed into a single unit that can be easily removed from the cockpit of the aircraft. Typically, all that would be required is disconnecting the pitch and roll interconnect rods 106, 108 and any wiring harnesses and the unit would be ready to be removed from the cockpit.

As used herein a control column is a line-replaceable-unit when all of the functionality of the control column is removable as a single unit. For instance, with reference to the control columns of system 100, all of the functionality of each control column 102, 104 is removed from the aircraft when the control column 102, 104 is removed.

If control column 102 were removed, all of its sensors 141 for sensing changes in pitch or roll; all of the restoring force arrangements (e.g. restoring force arrangement 206 and the restoring force arrangement for roll) that provide the feel to the control grip; the autopilot lockout 246 arrangement for the roll degree of freedom, and the disconnect mechanism 144 for the pitch degree of freedom would all be removed from the cockpit. All that the mechanic would be required to do to remove the control column 102 is disconnect the roll and pitch interconnect rods from the control column, such as at couplings 122, disconnect any wiring harnesses coupling the electrical components, and any screws, such as screws through the top cover of housing 126, securing the control column 102 to the cockpit. As such, all sensors, disconnect devices, restoring force devices, and autopilot lock out devices would remain as an entire unit as the control column is removed from the aircraft.

It is a further aspect of the invention that a single control column system could be provided. In such a system, only a single one of the control columns 102, 104 would be provided. With only a single control column, there would be no need for interconnect rods 106, 108 or any disconnect devices to decouple the pitch and roll degrees of freedom between the two control columns. However, such a unit would still have two restoring force arrangements (one for pitch, one for roll) and could incorporate the autopilot lockout. However, with only one control column, that single column would have two autopilot lockout devices, one device for pitch and one device for roll. This additional autopilot lock out device would generally take the location where the disconnect arrangement was located for that individual control column in the dual control column system 100.

In a single control column system where the control column is an LRU, the control column and all of its functionality would be removable from the aircraft as a single, self-contained, unit. As such, all of the sensors, force restoring arrangements would be removable as a single unit. Further, if any autopilot lockout was provided in the unit, the autopilot lockout mechanism would also be removable with the control column as part of the single unit.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A control system including:
   first and second control columns for receiving pitch and roll control inputs from a pilot for an aircraft, each control column having a control grip moveable along a pitch axis to adjust the pitch control input to the aircraft and moveable along a roll axes to adjust the roll control input to the aircraft;
   a roll interconnect rod operably coupling the first and second control columns for coordinated movement of the control grips along each control grips roll axis when an input is provided to either of the control grips; and
   a pitch interconnect rod operably coupling the first and second control columns for coordinated movement of the control grips along each control grips pitch axis when an input is provided to either of the control grips;
   further including a disconnect device interposed between the grip of the first control column and the grip of the second column for a selected one of pitch or roll, the disconnect device having a coupled state fixedly coupling the grips for coordinated movement along a selected one of the pitch axis or roll axis and a decoupled state in which the disconnect device does not fixedly couple the grips such that movement of one grip along the selected one of the pitch axis or roll axis is not translated to the other grip, the disconnect device including a solenoid actuated latch for transitioning the disconnect device from the coupled state to the decoupled state.

2. A control system including:
   first and second control columns for receiving pitch and roll control inputs from a pilot for an aircraft, each control column having a control grip moveable along a pitch axis to adjust the pitch control input to the aircraft and moveable along a roll axes to adjust the roll control input to the aircraft;
   a roll interconnect rod operably coupling the first and second control columns for coordinated movement of the control grips along each control grips roll axis when an input is provided to either of the control grips;
   a pitch interconnect rod operably coupling the first and second control columns for coordinated movement of the control grips along each control grips pitch axis when an input is provided to either of the control grips; and
   further including a disconnect device interposed between the grip of the first control column and the grip of the second column for a selected one of pitch or roll, the disconnect device having a coupled state fixedly coupling the grips for coordinated movement along a selected one of the pitch axis or roll axis and a decoupled state in which the disconnect device does not fixedly couple the grips such that movement of one grip along the selected one of the pitch axis or roll axis is not translated to the other grip;

wherein the disconnect device includes:

a pivot link that is operably coupled to the grip of one of the control columns for movement about a pivot axis;

a connection link pivotably coupled to the pivot link about a release axis that is offset from the pivot axis;

a clevis link pivotable relative to the pivot link about the pivot axis, the clevis link selectively engageable with the connection link to fix the clevis link relative to the pivot link, the clevis link being operably coupled to the pitch interconnect rod.

3. The control system of claim 2, including a pair of disconnect devices including a pitch disconnect device and a roll disconnect device, the pitch disconnect device interposed between the grip of the first control column and the grip of the second column, the pitch disconnect device having a coupled state fixedly coupling the grips for coordinated movement along each control grips pitch axis and a decoupled state in which the pitch disconnect device decouples the grips such that movement of one grip along the grip's pitch axis is not translated to the other grip; the roll disconnect device interposed between the grip of the first control column and the grip of the second column, the roll disconnect device having a coupled state fixedly coupling the grips for coordinated movement along each control grips roll axis and a decoupled state in which the roll disconnect device decouples the grips such that movement of one grip along the grip's roll axis is not translated to the other grip; and wherein each disconnect device includes:

a pivot link that is operably coupled to the grip of one of the control columns for movement about a pivot axis;

a connection link pivotably coupled to the pivot link about a release axis that is offset from the pivot axis;

a clevis link pivotable relative to the pivot link about the pivot axis, the clevis link selectively engageable with the connection link to fix the clevis link relative to the pivot link, the clevis link being operably coupled to the pitch interconnect rod.

4. The control system of claim 3, wherein the first control column includes the pitch disconnect device and the second control column includes the roll disconnect device.

5. The control system of claim 4, wherein the first and second control columns are line-replaceable-units.

6. The control system of claim 2, further including a latch arrangement between the pivot link and the connection link, the latch arrangement biasing the connection link into engagement with the clevis link in the coupled state.

7. The control system of claim 6, further including a disconnect biasing member biasing the connection link away from the clevis link to disconnect the connection link from the clevis link in the decoupled state.

8. The control system of claim 6, wherein the latch arrangement includes a pivoting catch and a preload spring, the preload spring extending between the pivoting catch and the connection link; in the coupled state, the pivoting catch is in a first position and tensions the preload spring to bias the connection link into engagement with the clevis link; in the decoupled state, the pivoting catch is in a second position and reduces the tension of the preload spring to allow the connection link to be decoupled from the clevis link.

9. The control system of claim 8, further including a disconnect biasing member biasing the connection link away from the clevis link to disconnect the connection link from the clevis link in the decoupled state when the pivoting catch is in the second position.

10. The control system of claim 2, wherein the connection link includes a pair of spaced apart rollers, a distal end of the clevis link is received between the pair of rollers in the coupled state.

11. The control system of claim 10, wherein the distal end of the clevis link includes a tapered tongue, the connection link being resiliently biased toward the clevis link.

12. The control system of claim 11, wherein the interconnect rod relating to the selected one of the pitch or roll is pivotally coupled to the clevis link at a position between the tapered tongue and the pivotal connection between the clevis link and the pivot link.

13. The control system of claim 8, further including a solenoid, the solenoid selectively engaging the pivoting catch in the coupled state and preventing the pivoting catch from transitioning from the first position to the second position, the solenoid being energized such that the solenoid disengages the pivoting catch allowing the pivoting catch to transition from the first position to the second position allowing the disconnect device to transition to the decoupled state.

14. The control system of claim 13, wherein the disconnect device must be manually reset.

15. The control system of claim 1, further including an autopilot lockout mechanism associated with a selected one of pitch or roll, the autopilot lockout mechanism providing increased resistance that must be overcome to manipulate the first and second control columns along the selected one of the pitch axis or roll axis when autopilot is activated.

16. A control system including:

first and second control columns for receiving pitch and roll control inputs from a pilot for an aircraft, each control column having a control grip moveable along a pitch axis to adjust the pitch control input to the aircraft and moveable along a roll axes to adjust the roll control input to the aircraft;

a roll interconnect rod operably coupling the first and second control columns for coordinated movement of the control grips along each control grips roll axis when an input is provided to either of the control grips; and a pitch interconnect rod operably coupling the first and second control columns for coordinated movement of the control grips along each control grips pitch axis when an input is provided to either of the control grips;

further including an autopilot lockout mechanism associated with a selected one of pitch or roll, the autopilot lockout mechanism providing increased resistance that must be overcome to manipulate the first and second control columns along the selected one of the pitch axis or roll axis when autopilot is activated; and wherein the autopilot lockout includes:

first and second autopilot plates being pivotable about an autopilot axis;

an autopilot resistance spring biasing ends of the first and second autopilot plates angularly toward one another about the autopilot axis;

a main link pivotable about the autopilot axis, the interconnect rod coupled to the control stick through the main link, the main link operably engaging the first autopilot plate when rotated angularly in a first direction and operably engaging the second autopilot plate when rotated angularly in a second direction, opposite the first direction;

a grounding arrangement, when autopilot is activated, selectively grounding the second autopilot plate when the main link is rotated in the first direction and selectively grounding the first autopilot plate when the main link is rotated in the second direction.

17. The control system of claim 16, wherein the main link includes an engagement tab angularly interposed between the first and second autopilot plates the engagement tab angularly engaging the first and second autopilot plates when the main link is rotated in the first and second directions, respectively.

18. The control system of claim 17, wherein grounding arrangement includes a lockout arm that includes an abutment angularly interposed between the first and second autopilot plates, at least when autopilot is activated, the abutment engaging the first and second autopilot plates when the first and second autopilot plates are grounded.

19. The control system of claim 18, wherein the lockout arm is transitional between a lockout position when autopilot is activated and a relief position when autopilot is not activated;
- in the lockout position, the abutment engages with the first autopilot plate when the main link rotates in the second direction and engages with the second autopilot plate when the main link rotates in the second direction;
- in the relief position, the abutment does not engage either the first or second autopilot plates when the main link is rotated about the autopilot axis.

\* \* \* \* \*